March 24, 1970   B. J. WILLIAMS   3,502,098
RISER VALVE
Filed Aug. 27, 1968
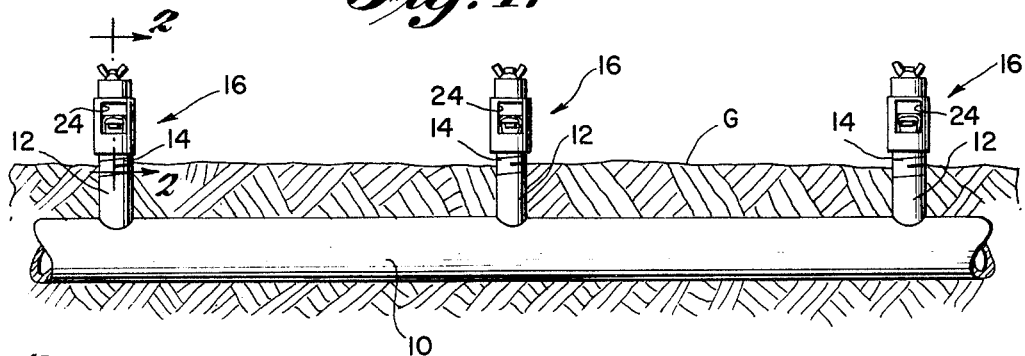
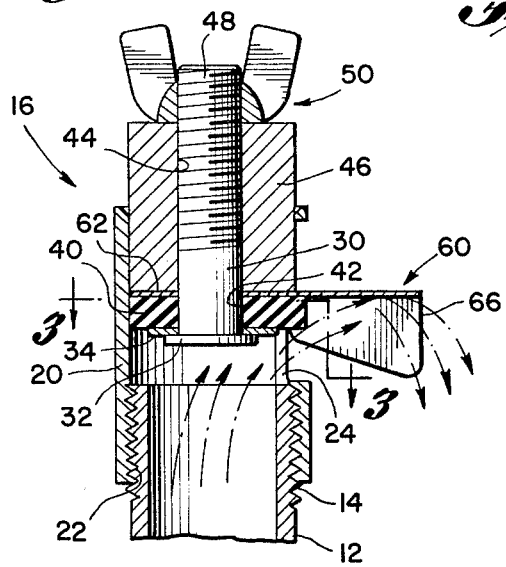
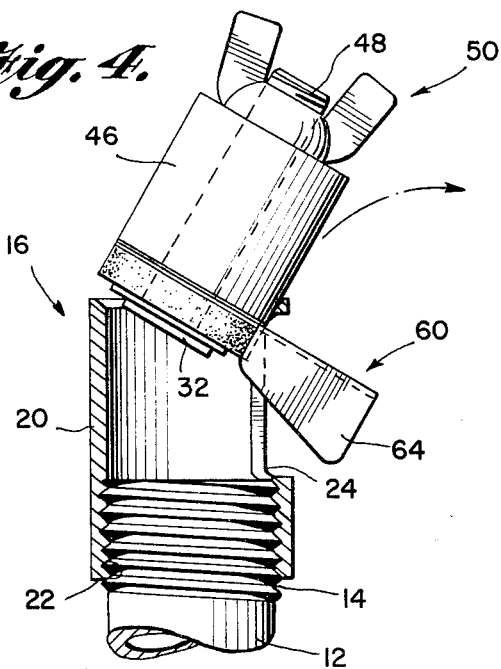
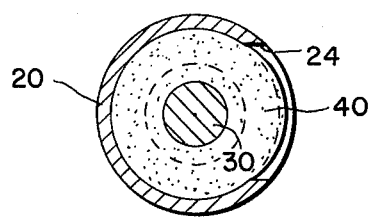
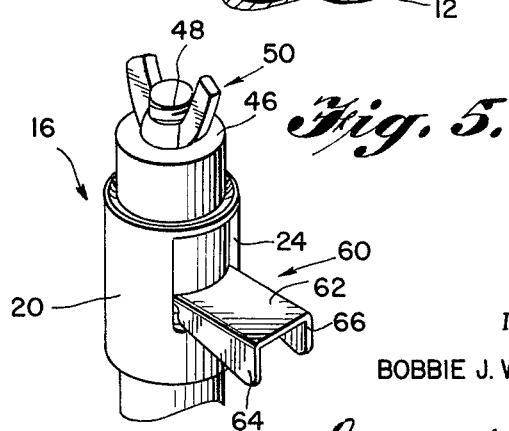
INVENTOR
BOBBIE J. WILLIAMS
BY Shoemaker and Mattare
ATTORNEYS

United States Patent Office 3,502,098
Patented Mar. 24, 1970

3,502,098
RISER VALVE
Bobbie J. Williams, Rte. 1, Saul Road,
Sunnyside, Wash.
Filed Aug. 27, 1968, Ser. No. 755,634
Int. Cl. A01q 25/00; F16k 27/00, 31/50
U.S. Cl. 137—382                                           9 Claims

ABSTRACT OF THE DISCLOSURE

A hollow valve casing is open at the top thereof and has a lateral discharge opening formed therein. A movable valve means includes an elongated threaded member having an enlarged head at one end thereof with which an annular resilient sealing portion is engageable. A deflector means is in engagement with the resilient sealing portion and extends laterally through said discharge opening. A spacer member has a central hole formed therethrough through which the elongated threaded member extends, and a wing nut is threaded on the outer end of the elongated member and engages the spacer member for compressing and expanding the resilient sealing portion into engagement with the valve casing.

BACKGROUND OF THE INVENTION

The present invention relates to a riser valve for use in a low pressure irrigation system, the valve means being employed for controlling the flow of water from individual outlets of the irrigation system as used for irrigating row crops in cultivated fields.

Valve means for this type of application should be capable of being automatically opened by water pressure in the irrigation system, and at the same time should incorporate readily adjustable means for setting each one of the valves so as to control the flow rate from the associated outlet.

It is additionally desirable to provide an arrangement whereby the movable valve means of the riser valve may be completely removed so as to enable full flow to occur from a particular outlet. By providing such a removable arrangement, the movable valve means may also be readily repaired or replaced when necessary.

SUMMARY OF THE INVENTION

In the present invention, a hollow valve casing is provided having a lateral discharge opening, the valve casing being open at the top thereof.

A movable valve means is movably mounted within the valve casing and includes a resilient sealing portion which may be expanded by compression into engagement with the valve casing to fix the movable valve means in a desired operative position so that the flow rate through the lateral discharge opening can be readily adjusted.

The resilient sealing portion is expanded into operative position by an operating means including an elongated threaded member having nut means disposed thereon which engages a spacer member adapted to apply pressure to said resilient sealing portion to expand it radially outwardly.

When the nut means is released, the valve automatically opens under water pressure and then can be readily manually adjusted and secured in place by said nut means.

A deflector means is also provided which is operatively interconnected with the movable valve means and extends outwardly through the lateral discharge opening. This deflector means serves to direct water outwardly from the valve casing and serves the additional purpose of preventing the movable valve means from coming out of the open top of the valve casing when the resilient sealing portion is not in expanded position.

The movable valve means may be completely removed from the valve casing when so desired, thereby permitting full flow of water from the outlet which is required when sandy soil is being irrigated. Additionally, this enables the movable valve means to be readily repaired or replaced when necessary.

BRIEF DESCRIPTION OF THE DRAWING

FIG. 1 is a view illustrating an irrigation system incorporating the riser valve of the present invention;

FIG. 2 is a section on an enlarged scale taken substantially along line 2—2 of FIG. 1 looking in the direction of the arrows;

FIG. 3 is a sectional view taken substantially along line 3—3 of FIG. 2 looking in the direction of the arrows;

FIG. 4 is a view similar to FIG. 2 illustrating the manner in which the movable valve means is completely removable from the associated valve casing; and FIG. 5 is a top perspective view of one of the riser valves of the present invention.

DESCRIPTION OF THE PREFERRED EMBODIMENT

Referring now to the drawings wherein like reference characters designate corresponding parts throughout the several views, an irrigation system according to the present invention is indicated in FIG. 1 wherein a typical concrete irrigation conduit is indicated by reference numeral 10. This conduit is disposed beneath the ground level as indicated by reference character G, and a plurality of risers 12 are provided, these risers comprising steel pipes which are threaded at the upper ends 14 thereof and are disposed above the ground level so that the riser valves 16 associated with each of the risers are disposed above the ground level for discharging water into adjacent irrigation ditches or the like.

Referring now to FIGS. 2-5 inclusive, each riser valve 16 includes a valve casing 20 which is of generally cylindrical configuration being hollow and open at the upper and lower ends thereof. The lower end is provided with internal threads 22 which are threaded on the upper threaded end 14 of an associated riser 12 to secure the riser valve in place.

The smooth bore formed through valve casing 20 above the lower internally threaded portion thereof is substantially cylindrical, and a lateral discharge opening 24 is provided through the side of the valve casing adjacent to the open top thereof. This lateral discharge opening has a generally rectangular configuration as viewed from a side of the valve as seen most clearly in FIG. 1.

An elongated member 30 includes an enlarged head 32 at the lower end thereof which is rigidly secured to a washer portion 34. These portions 32 and 34 may be formed integral if so desired, the principal purpose of this lower enlarged head being to support a resilient sealing portion 40 in the form of an annular rubber washer or the like which can be compressed so as to expand radially outwardly to hold the movable valve means in place within the associated valve casing.

The elongated member 30 extends upwardly through the central hole 42 formed in resilient sealing portion 40 and further extends through a longitudinal bore 44 formed in a spacer member 46 which is snugly but slidably received within the upper portion of the bore formed in the valve casing. The upper end 48 of elongated member 30 is threaded, and a wing nut 50 is threaded thereupon, the wing nut being engageable with spacer member 46.

A deflector means is indicated generally by reference numeral 60 and includes a flat elongated portion 62 which is interposed between the upper surface of the resilient washer 40 and the undersurface of spacer member 46. This flat portion 62 has a hole formed therethrough which receives elongated member 30. Flat portion 62 extends outwardly through the lateral discharge opening 24, and the outwardly extending part thereof includes two downturned ears 64 and 66 formed at opposite sides thereof as seen most clearly in FIG. 5.

In operation, when wing nut 50 is loosened, the resilient washer 40 will not be under compression and accordingly will not be radially expanded into engagement with the inner surface of the associated valve casing. Accordingly, water pressure within the riser 12 will cause the movable valve means disposed within the valve casing to rise upwardly until the deflector means engages the top of the discharge opening 24.

The movable valve means can be manually tipped into the position shown in FIG. 4 whereupon the entire movable valve means can be removed from the valve casing, the laterally outwardly extending portion of the deflector means being adapted to move freely through the lateral discharge opening 24.

The deflector means prevents the movable valve means from moving outwardly of the valve casing during normal operation due to the fact that water pressure acting on the laterally outwardly extending portion of the deflector means will hold the movable valve means in a horizontal position such as indicated in FIG. 2.

The movable valve means may then be moved for example into a position as shown in FIG. 2, whereupon the wing nut 50 is moved downwardly to engage the spacer means 46. The spacer means 46 will in turn move downwardly against the deflector means which serves to compress the resilient washer member 40 against the enlarged head of elongated member 30.

As the resilient washer member 40 is compressed, it will expand radially outwardly. FIG. 3 illustrates the manner in which that portion of the washer which is disposed adjacent the lateral discharge opening 24 tends to be squeezed outwardly so as to form an arc greater than the original diameter thereof. It is apparent that this radial expansion of the resilient washer member will cause the movable valve means to be locked into position since member 40 resiliently and tightly engages the inner surface of hte valve casing.

When it is subsequently desired to move the movable valve means to a different adjusted position or to remove it from the associated valve casing, the wing nut can be loosened to perform this operation.

What is claimed is:

1. A riser valve comprising a hollow cylindrical valve casing for communication with a source of liquid under pressure, said valve casing having a longitudinally extending lateral discharge opening of uniform transverse width formed therein, longitudinally movable valve means supported within said hollow valve casing, said movable valve means including an annular resilient sealing portion traversing said opening for sealing engagement with the interior of said valve casing and for controlling the effective size of said opening, said valve casing having an open top, and operating means extending through said open top for moving said resilient sealing portion into sealing engagement with said valve casing to hold the valve means in an adjusted predetermined position along said opening.

2. Apparatus as defined in claim 1 wherein said operating means includes an elongated threaded member, and nut means engaging said threaded member for compressing said resilient sealing portion.

3. Apparatus as defined in claim 2 wherein said elongated threaded member includes an enlarged head, said resilient sealing portion comprising an annular member in engagement with said enlarged head.

4. Apparatus as defined in claim 3 including a spacer member interposed between said nut means and said resilient sealing portion.

5. Apparatus as defined in claim 1 including deflector means extending laterally of said movable valve means.

6. Apparatus as defined in claim 5 wherein said deflector means extends through said hole and outwardly of said valve casing.

7. Apparatus as defined in claim 6 wherein the inner portion of said deflector means is operatively connected with said movable valve means.

8. Apparatus as defined in claim 1 wherein said valve casing is open at the top thereof, said lateral discharge opening being disposed adjacent the top of said valve casing, and deflector means operatively connected with said movable valve means and extending laterally through said discharge opening to prevent the movable valve means from moving through the open top of said valve casing.

9. Apparatus as defined in claim 1 wherein said resilient sealing portion is an annular member, said operating means including an elongated threaded member having an enlarged head, said annular member being in engagement with said enlarged head, a spacer member having a hole formed longitudinally therethrough, said elongated threaded member extending through the hole in said spacer member, nut means threaded on the outer end of said elongated threaded member and being engageable with said spacer member for compressing said resilient sealing portion, and deflector means extending laterally through said discharge opening and being interconnected with said movable valve means.

References Cited

UNITED STATES PATENTS

| | | | |
|---|---|---|---|
| 1,014,168 | 1/1912 | Nolan | 251—189 |
| 2,482,687 | 9/1949 | Mueller et al. | 138—89 |
| 2,953,154 | 9/1960 | Agoliati et al. | 251—189 XR |
| 3,044,496 | 7/1962 | Maisch | 138—89 |
| 3,159,172 | 12/1964 | Baxter | 137—236 |

FOREIGN PATENTS

| | | |
|---|---|---|
| 1,079,220 | 5/1954 | France. |

HENRY T. KLINKSIEK, Primary Examiner

U.S. Cl. X.R.

239—521, 542